(12) United States Patent
Takehara et al.

(10) Patent No.: US 6,594,127 B2
(45) Date of Patent: Jul. 15, 2003

(54) POWER GENERATION SYSTEM, AND METHOD FOR INSTALLING THE SAME

(75) Inventors: Nobuyoshi Takehara, Kyoto (JP); Naoki Manabe, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/289,435

(22) Filed: Nov. 7, 2002

(65) Prior Publication Data

US 2003/0067724 A1 Apr. 10, 2003

Related U.S. Application Data

(62) Division of application No. 09/722,651, filed on Nov. 28, 2000.

(30) Foreign Application Priority Data

Nov. 29, 1999 (JP) ............................................ 11-337471

(51) Int. Cl.[7] ................................................. H02H 3/16
(52) U.S. Cl. ........................................ 361/42; 361/62
(58) Field of Search ............................... 361/42, 62, 96

(56) References Cited

U.S. PATENT DOCUMENTS

| | | | |
|---|---|---|---|
| 4,710,844 A | 12/1987 | Scott et al. | .................... 361/96 |
| 6,259,017 B1 | 7/2001 | Takehara et al. | ............ 136/293 |

*Primary Examiner*—Brian Sircus
*Assistant Examiner*—Boris Benenson
(74) *Attorney, Agent, or Firm*—Fitzpatrick, Cella, Harper & Scinto (57) ABSTRACT

In a power generation system including a DC power supply which is connected to a low-voltage distribution system to which a plurality of consumers, each having an earth leakage breaker, are connected and one wire of which is grounded, via a receiving-end earth leakage breaker, and which includes at least a transformerless inverter and an earth floating capacitance, an operational time limit of the receiving-end earth leakage breaker of the power generation system is set to a value larger than an operational time limit of the earth leakage breakers provided in the consumers. The system also includes a ground-direction determination device for determining whether a grounded position is inside or outside the power generation system. Thus, a power generation system in which an unnecessary disconnection of electric power supply does not occur when an accident of external grounding has occurred.

21 Claims, 9 Drawing Sheets

POWER GENERATION SYSTEM, AND METHOD FOR INSTALLING THE SAME

This application is a division of application Ser. No. 09/722,651, filed Nov. 28, 2000.

BACKGROUND OF THE INVENTION

1. Field of the Invention

The present invention relates to a power generation system, and more particularly, to a power generation system which can prevent an unnecessary operation due to an accident of external grounding.

2. Description of the Related Art

Figure 9:
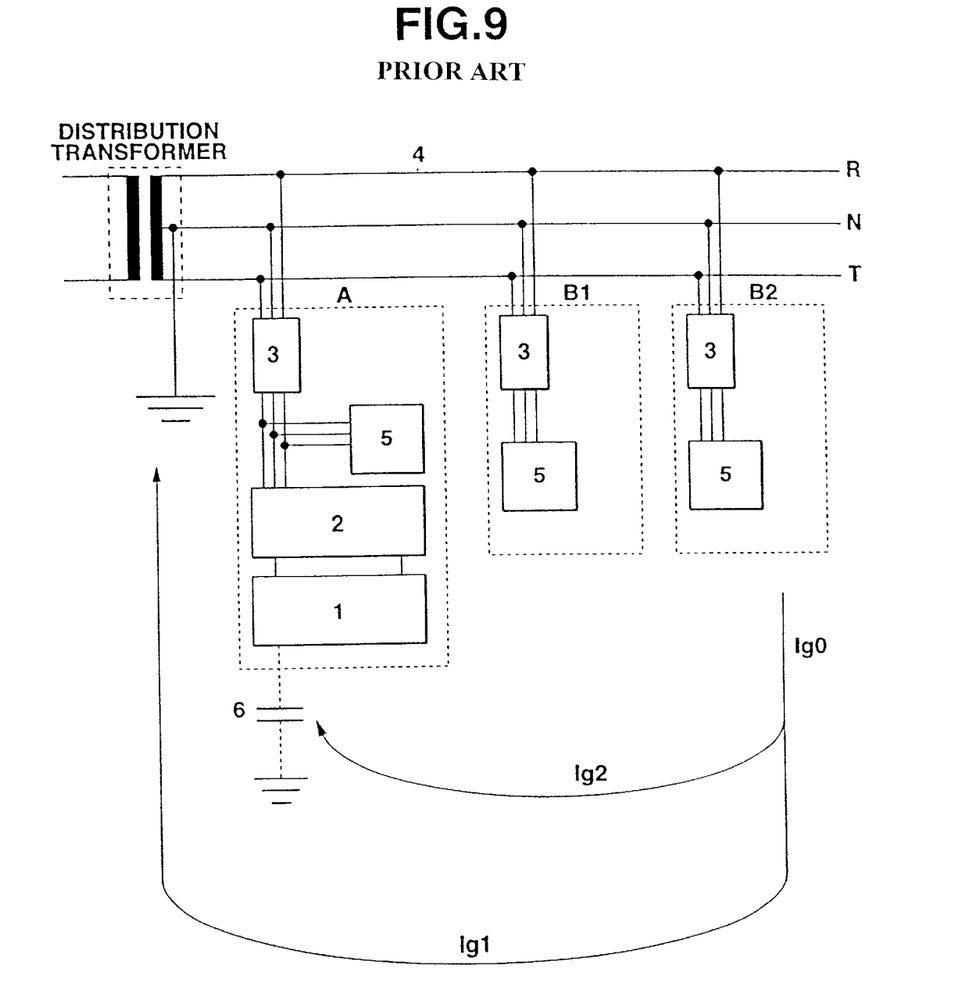
FIG. 9 is a schematic diagram illustrating an example of conventional connection between a power generation system and a low-voltage distribution system.

A description will now be provided of a solar power generation system connected to an ordinary low-voltage distribution system with reference to FIG. 9. FIG. 9 is a schematic diagram illustrating conventional connection between a solar power generation system and a low-voltage distribution system. In FIG. 9, A represents a consumer having a solar power generation system, which includes a solar-cell array 1, a system interconnection inverter 2, and a receiving-end earth leakage breaker 3. The solar-cell array 1, serving as a DC power supply, includes solar-cell modules interconnected in series and/or in parallel so as to provide desired voltage and current. The solar-cell array 1 is connected to the system interconnection inverter 2, which is connected to a low-voltage distribution system 4 via the receiving-end earth leakage breaker 3. A load 5 is connected between the system interconnection inverter 2 and the receiving-end earth leakage breaker 3. DC electric power from the solar-cell array 1 is input to the system interconnection inverter 2 in order to be converted into an AC electric power, which is output to the load 5 or the low-voltage distribution system 4. Wiring within the consumer A is provided from the receiving-end earth leakage breaker 3 to the system interconnection inverter 2 and to the load 5. The receiving-end earth leakage breaker 3 detects an accident of grounding by detecting a ground current, and disconnects connection between the inside and the outside of the consumer A so that the accident of grounding does not influence the low-voltage distribution system 4 at the outside of the consumer A.

Other consumers B1 and B2 which do not have power generation facilities are connected to the low-voltage distribution system 4 via respective receiving-end earth leakage breakers 3.

Since the solar-cell array 1 has a large area, an earth floating capacitance 6 is present. Recently, solar-cell modules integrated with a building material, or thin solar-cell modules have been developed as solar-cell modules constituting the solar-cell array 1. Sometimes, a conductive member (a metal plate or the like) is used as a reinforcing material or a substrate material for such a solar-cell module. In such a case, a solar-cell array sometimes faces a metal plate with a short distance and a large area, thereby increasing the earth floating capacitance 6. Particularly when the metal plate is grounded, the solar-cell array has a stable earth floating capacitance. Furthermore, if, for example, water from rain adheres to the surface of the solar-cell array, the earth floating capacitance 6 is sometimes generated via the water.

In accordance with recent tendency toward a higher efficiency, a smaller size, a lighter weight and a lower cost and the like, the system interconnection inverter 2 mostly adopts a transformerless system in which an insulating transformer is not provided.

We found that, if an accident of grounding occurs at another consumer B1 or B2 when the earth floating capacitance 6 is large and the system interconnection inverter 2 adopts the transformerless system, a ground current Ig2 penetrates into the system via the earth floating capacitance 6 of the solar-cell array 1, passes through the system interconnection inverter 2, and is detected by the reception-end earth leakage breaker 3, thereby causing an unnecessary operation. If such an unnecessary operation is generated, the inside of the consumer A having the solar power generation system is disconnected from the low-voltage distribution system 4 and power supply to the inside of the consumer A is failed, although no accident occurs within the consumer A.

The above-described problems are not limited to the solar power generation system. For example, in a wind power generation system or in a power generation system using fuel cells or the like, the same problems also arise if the earth floating capacitance is large. Hence, there is the possibility that the reception-end earth leakage breaker unnecessarily operates due to an accident of external grounding and electric power supply fails within a consumer.

SUMMARY OF THE INVENTION

It is an object of the present invention to solve the above-described problems.

It is another object of the present invention to provide a power generation system which can prevent an unnecessary operation of a receiving-end earth leakage breaker due to an accident of external grounding.

According to one aspect, the present invention which achieves these objectives relates to a power generation system including a DC power supply connected to a low-voltage distribution system to which a plurality of consumers, each having an earth leakage breaker, are connected and one wire of which is grounded, via a receiving-end earth leakage breaker, and including at least a transformerless inverter and an earth floating capacitance. An operational time limit of the receiving-end earth leakage breaker of the power generation system is set to a value larger than an operational time limit of the earth leakage breakers provided in the consumers.

According to another aspect, the present invention which achieves these objectives relates to a power generation system including a DC power supply connected to a low-voltage distribution system one wire of which is grounded, via a receiving-end earth leakage breaker, and including at least a transformerless inverter and an earth floating capacitance. The system also includes ground-direction determination means for determining whether a grounded position is inside or outside the power generation system.

According to still another aspect, the present invention which achieves these objectives relates to a power generation system including a DC power supply connected to a low-voltage distribution system one wire of which is grounded, via a receiving-end earth leakage breaker, and including at least a transformerless inverter and an earth floating capacitance. The receiving-end earth leakage breaker includes voltage-to-ground detection means, a zero-phase current transformer, zero-phase-current detection means connected to the zero-phase current transformer, phase comparison means connected to the voltage-to-ground detection means and the zero-phase-current detection means, a time-limit selector, connected to the phase comparison means, for selecting a different time limit in accordance with a signal output from the phase comparison means, zero-phase-current-level determination means connected to the zero-phase-current detection means, and contact driving means, connected to the zero-phase-current-level determination means and the time-limit selector, for driving a contact in accordance with an output of each of the zero-phase-current-level determination means and the time-limit selector.

According to yet another aspect, the present invention which achieves these objectives relates to a power generation system including a DC power supply connected to a low-voltage distribution system one wire of which is grounded, via a receiving-end earth leakage breaker, and including at least a transformerless inverter and an earth floating capacitance. The receiving-end earth leakage breaker includes voltage-to-ground detection means, voltage-to-ground-level determination means connected to the voltage-to-ground detection means, a zero-phase current transformer, zero-phase-current detection means connected to the zero-phase current transformer, zero-phase-current level determination means connected to the zero-phase-current detection means, and contact driving means, connected to the zero-phase-current-level determination means and the voltage-to-ground-level determination means, for driving a contact in accordance with an output of each of the zero-phase-current-level determination means and the voltage-to-ground-level determination means.

According to yet another aspect, the present invention which achieves these objectives relates to a power generation system including a DC power supply connected to a low-voltage distribution system one wire of which is grounded, via a receiving-end earth leakage breaker, and including at least a transformerless inverter and an earth floating capacitance. The receiving-end earth leakage breaker includes voltage-to-ground detection means, voltage-to-ground-level determination means connected to the voltage-to-ground detection means, a time-limit selector, connected to the voltage-to-ground-level determination means, for selecting a time limit in accordance with an output of the voltage-to-ground detection means, a zero-phase current transformer, zero-phase-current detection means connected to the zero-phase current transformer, zero-phase-current-level determination means connected to the zero-phase-current detection means, and contact driving means, connected to the zero-phase-current-level determination means and the time-limit selector, for driving a contact in accordance with an output of each of the zero-phase-current-level determination means and the time-limit selector.

According to yet a further aspect, the present invention which achieves these objectives relates to a power-generation-system installing method including the step of connecting a power generation system including a DC power supply, including at least a transformerless inverter and an earth floating capacitance, to a low-voltage distribution system to which a plurality of consumers, each having an earth leakage breaker, are connected and one wire of which is grounded, via a receiving-end earth leakage breaker. An operation time of the receiving-end earth leakage breaker is set to a value larger than an operational time limit of the earth leakage breakers provided in the consumers.

According to still another aspect, the present invention which achieves these objectives relates to a power-generation-system installing method including the step of connecting a power generation system including a DC power supply, including at least a transformerless inverter and an earth floating capacitance, to a low-voltage distribution system one wire of which is grounded, via a receiving-end earth leakage breaker. In the method, ground-direction determination means for determining whether a ground position is inside or outside the power generation system is provided.

The foregoing and other objects, advantages and features of the present invention will become more apparent from the following description of the preferred embodiments taken in conjunction with the accompanying drawings.

DESCRIPTION OF THE PREFERRED EMBODIMENTS

A power generation system according to the present invention is preferably connected to a low-voltage distribution system including a single-phase low-voltage distribution system and a three-phase distribution system which are commonly grounded.

The power generation system according to the present invention preferably operates such that a time until a receiving-end earth leakage breaker operates when ground-direction determination means has determined that a grounded position is inside the system is shorter than a time until the receiving-end earth leakage breaker operates when the ground-direction determination means has determined that the grounded position is outside the system, and such that the receiving-end earth leakage breaker operates when the ground-direction determination means has determined that the grounded position is inside the system, and the receiving-end earth leakage breaker does not operate when the ground-direction determination means has determined that the grounded position is outside the system.

The ground-direction determination means preferably determines whether the grounded position is inside or outside the system, from a phase difference between a voltage to ground of a ground-side terminal of the low-voltage distribution system and a zero-phase current. When a transformerless inverter is connected to the single-phase distribution system, ground-direction determination means for determining that the grounded position is outside the system when a voltage to ground of a ground-side terminal of the single-phase distribution system is higher than a normal value in the single-phase system is preferably used.

A DC power supply preferably includes solar cells. The solar cell preferably includes a solar-cell element and a metal plate. The metal plate is preferably grounded. A DC power supply configured by a solar-cell array in which a plurality of solar cells are connected in series and/or in parallel is preferably used in the present invention.

The above-described preferred arrangements may also be applied to a power-generation-system installing method according to the present invention.

Preferred embodiments of the present invention will now be described with reference to the drawings.

First Embodiment

In a first embodiment of the present invention, a description will be provided of a system in which an operational time limit of a receiving-end earth leakage breaker at the power generation system side is set to a value larger than an operational time limit of receiving-end earth leakage breakers of other consumers connected to the same low-voltage distribution system. The first embodiment has the feature that the objects of the present invention can be substantially achieved very easily and inexpensively.

Usually, a receiving-end earth leakage breaker (hereinafter abbreviated as an "earth leakage breaker") is provided in each of consumers other than a consumer having a power generation system. When an accident of grounding occurs inside the consumer having the power generation system, the earth leakage breaker operates with an appropriate response speed (mostly within 0.1 second), and electric power supply from the low-voltage distribution system to the consumer is disconnected. The essential technical concept of the first embodiment is that at that time, disconnection of electric power supply due to leakage in other consumers is prevented by prohibiting the earth leakage breaker of the consumer having the power generation system to operate for a small amount of time.

Figure 1:
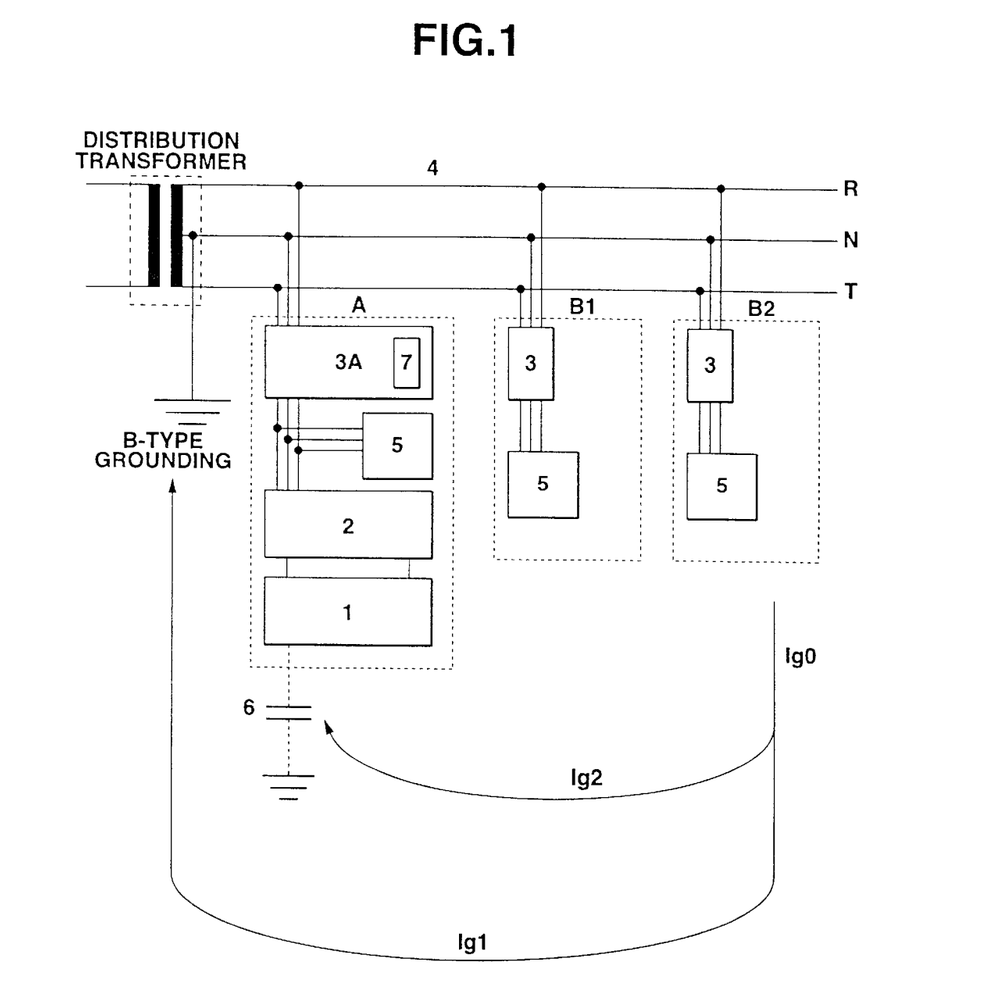
FIG. 1 is a schematic diagram illustrating a preferred example of connection between a power generation system and a low-voltage distribution system according to a first embodiment of the present invention.

The power generation system according to the first embodiment will now be described with reference to FIG. 1. FIG. 1 is a schematic diagram illustrating a preferred example of connection between the power generation system and the low-voltage distribution system according to the first embodiment.

(DC Power Supply)

The DC power supply of the power generation system of the present invention is not limited to a specific type, provided that it has an earth floating capacitance. However, as will be described later, a power supply including a solar cell is preferable as the DC power supply.

(Solar-Cell Array)

A solar-cell array 1 preferably used as the DC power supply of the present invention may have various configurations. Although a single solar cell may, of course, be used as the DC power supply instead of the array, a solar-cell array including a plurality of solar cells is suitable for obtaining large electric power. Any solar-cell array may be used as the solar-cell array 1, provided that it has an earth floating capacitance 6, and the type of solar cell modules constituting the solar-cell array 1 is not limited to a specific type. The effects of the present invention are more pronounced as the earth floating capacitance 6 is larger. The effects of the present invention are particularly pronounced when the solar-cell array 1 is configured, for example, by solar-cell modules in each of which a solar cell (element) is subjected to resin sealing on a metal reinforcing plate, solar-cell modules, each formed so as to contact a metal plate, or solar-cell modules integrally formed with a building material. The effects of the present invention may also be obtained when using a solar-cell array including solar-cell modules whose earth floating capacitance 6 is usually small but increases by rain or the like. When the metal reinforcing plate, the metal plate or the like which has been described above is grounded, since a stable earth floating capacitance is present, unnecessary disconnection tends to occur, so that the effects of the present invention can be pronouncedly obtained. The range of the earth floating capacitance with which the effects of the present invention are pronounced is at least 0.1 $\mu$F. There is no limit for the earth floating capacitance because theoretically, the leakage current is larger as the capacitance is larger.

In the first embodiment, an array of 3.6 kWp was formed by using 60 (15 in series and 4 in parallel) solar-cell modules, each having a metal plate as the substrate (made by Canon Inc., product type BS2-01, with a rated output of 60 Wp (watt peak)). All of the substrate metal plates are grounded. The measured value of the earth floating capacitance at that time was 2.4 $\mu$F. Theoretically, the capacitance of a filter capacitor within the inverter, and the like are, of course, included in the earth floating capacitance 6. The point is that the electrostatic capacitance of the DC circuit with respect to the ground causes a problem.

(Inverter)

An inverter 2 is a transformerless inverter. Various types of transformerless inverters may be used. The present invention is made in consideration of the occurrence of penetration of an external ground current in a power generation system in which a non-insulating inverter and a DC power supply having a floating capacitance are combined. A transformerless inverter is indispensable for providing such a situation. In the first embodiment, a transformerless inverter made by Japan Storage Battery Co., Ltd. (type LINEBACK FX) was used. It is desirable that the output electric system (single phase/three phase, voltage, frequency) of the inverter coincides with the connected distribution system.

(Low-Voltage Distribution System)

A low-voltage distribution system one wire of which is grounded may be used as a low-voltage distribution system 4. There is no limitation in the voltage, the frequency and the distribution method of the low-voltage distribution system 4. In the first embodiment, a single-phase three-wire distribution system with a voltage of 100 V/200 V and a frequency of 60 Hz is used.

(Load)

Any load may be used as a load 5, provided that it consumes electric power. For example, an ordinary electric appliance may be used. In the first embodiment, a 1 kW electric radiant heater was used as the load 5. Such heaters were installed in the consumers A, B1 and B2.

(Receiving-End Earth Leakage Breaker)

An earth leakage breaker incorporating operational-time-limit setting means 7 is adopted as an earth leakage breaker 3A used in the power generation system. Since many such earth leakage breakers are commercially available, one of such breakers may be used. The operational current of the breaker 3A is 30 mA. The operational-time-limit setting means 7 may, of course, be separately provided. Any one of various known digital or analog techniques may be used for setting an operational time limit.

In the first embodiment, an earth leakage breaker having a rated operational current of 30 mA and an operational time limit equal to or less than 0.1 second was selected as an earth leakage breaker 3 of another consumer B1 or B2, because an earth leakage breaker with a sensitivity and an operational current having values close to the above-described ones is mostly used in ordinary homes.

The essential technical concept of the first embodiment is that disconnection of power supply due to leakage in another consumer is prevented by causing an earth leakage breaker of a consumer having a power generation system not to operate for a small time period. Accordingly, the operational time limit of the earth leakage breaker 3A of the power generation system was set to 0.8 second which is larger than the operational time limit of the earth leakage breakers 3 of the other consumers B1 and B2. The operational time limit of the earth leakage breaker 3A is preferably as short as possible within a range of achievement of the objects of the present invention. More specifically, the operational time limit is preferably set to a value equal to or larger than 0.1 second and equal to or less than 1.0 second.

The time limit may be changed by changing the rated operational current instead of directly changing the delay time limit. This approach utilizes the fact that, when leakage currents having the same magnitude flow, an earth leakage breaker having a larger rated operational current (having a smaller sensitivity) operates slower. That is, it is only necessary to set the rated operational current of the earth leakage breaker 3A of the power generation system to a value larger than the rated operational current of the earth leakage breakers 3 of the consumers B1 and B2. However, it is preferable to prevent an extreme decrease in the sensitivity. More specifically, the rated operational current of the earth leakage breaker 3A is preferably set to a value equal to or larger than 100 mA and equal to or less than 1,000 mA.

When constructing the system using a commercially available earth leakage breaker, it is preferable to directly change the delay time limit than changing the rated operational current, because setting of conditions is easier.

(Operational Test)

An accident of grounding with a leakage current of 500 mA for 0.1 second was generated in the consumer B2. The earth leakage breaker of the consumer B2 operated in about 50 ms, and the earth leakage breaker of the consumer B1 did not operate because there was no penetration of the leakage current. Although the leakage current penetrated into the power generation system was as high as about 200 mA, it could be confirmed that the earth leakage breaker 3A did not operate and an unnecessary disconnection did not occur.

Second Embodiment

In a second embodiment of the present invention, a description will be provided of a system which uses ground-direction determination means for determining whether or not grounding has occurred outside a power generation system, in a function of detecting grounding of the system.

Figure 8:
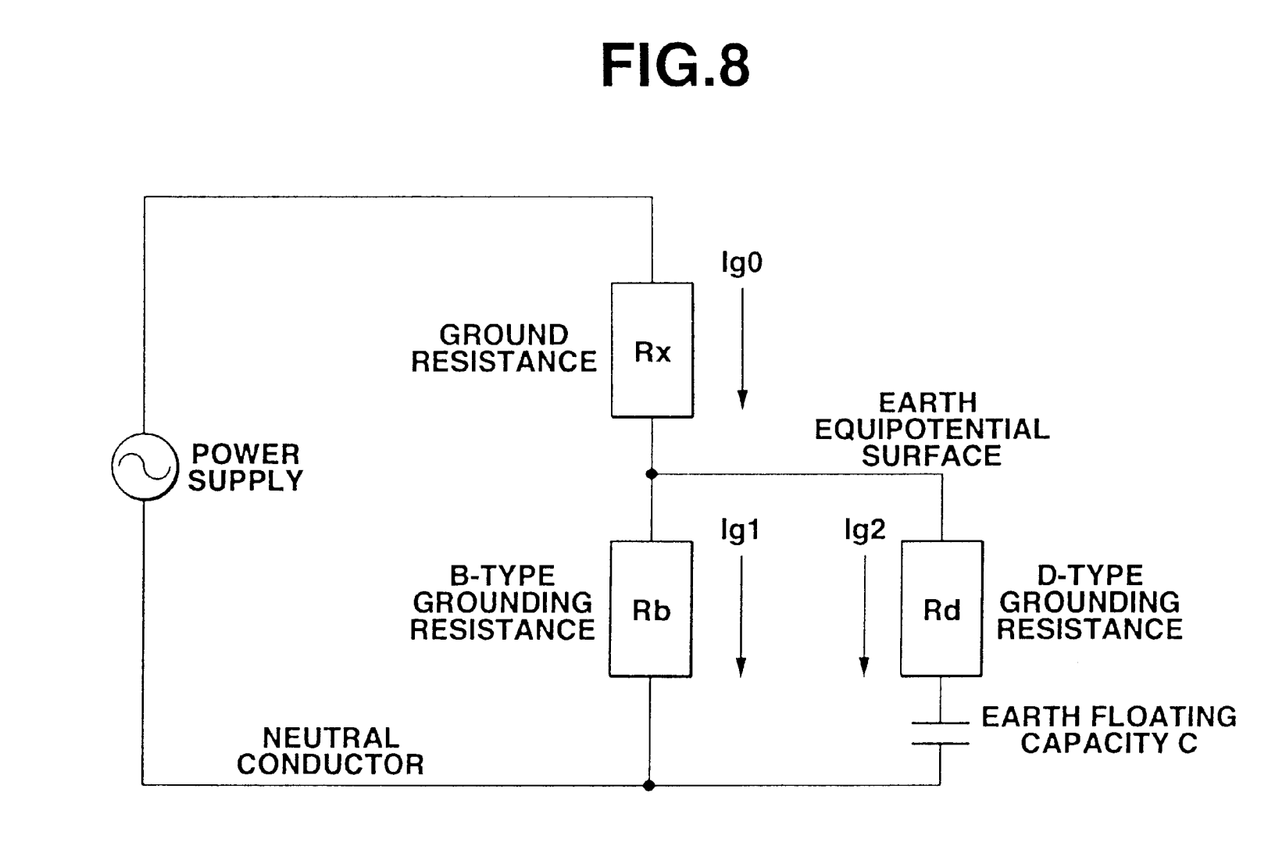
FIG. 8 is a schematic diagram illustrating a pseudo-equivalent circuit showing a generation path of a penetrating ground current.

As shown in FIG. 9 illustrating the conventional case, the ground current Ig2 penetrates into the power generation system A via the earth floating capacitance 6. FIG. 8 illustrates a pseudo-equivalent circuit at that time. A ground current Ig0 generated due to a ground resistance Rx of the consumer B2 is divided into a current Ig1 flowing through a B-type grounding resistance Rb which is originally to flow, and current Ig2 flowing through a series circuit including a D-type grounding resistance Rd and an earth floating capacitance C (when the substrate metal plate of the solar cell module is subjected to D-type grounding). Accordingly, in this case, when the potential to ground of the neutral conductor is made a reference phase, the zero-phase current flowing through the power generation system (the penetrating ground current Ig2) flowing through the power generation system is a leading current. The great feature of the second embodiment is to control the operation of the earth leakage breaker by determining whether grounding has occurred outside or inside the consumer A by detecting the penetrating ground current Ig2.

Figure 2:
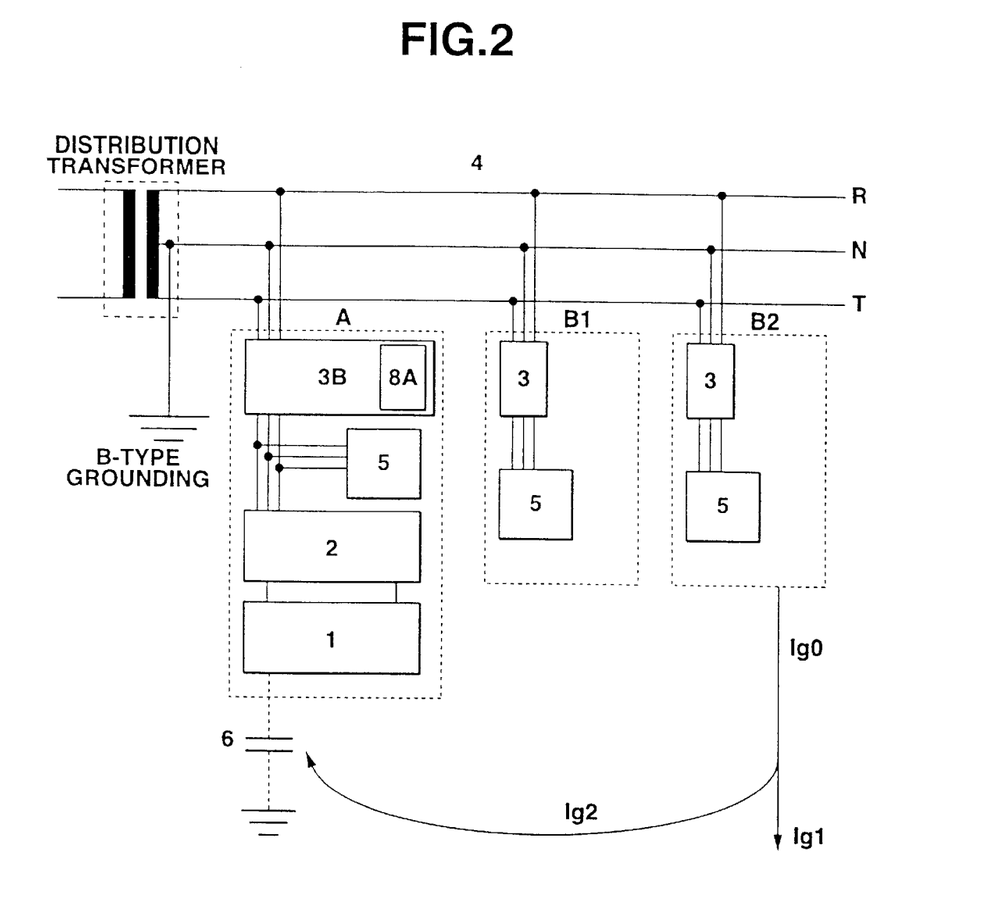
FIG. 2 is a schematic diagram illustrating a preferred example of connection between a power generation system and a low-voltage distribution system according to a second embodiment of the present invention.

FIG. 2 is a schematic diagram illustrating a preferred example of connection between a power generation system and a low-voltage distribution system according to the second embodiment. In FIG. 2, A represents a consumer having a solar power generation system, and an earth leakage breaker 3B in the power generation system includes ground-direction determination means 8A. In FIG. 2, a solar-cell array 1, a system interconnection inverter 2, a low-voltage distribution system 4, a load 5, and earth leakage breakers 3 used in consumers B1 and B2 are the same as those in the first embodiment.

(Configuration of the Earth Leakage Breaker 3B)

Figure 3:
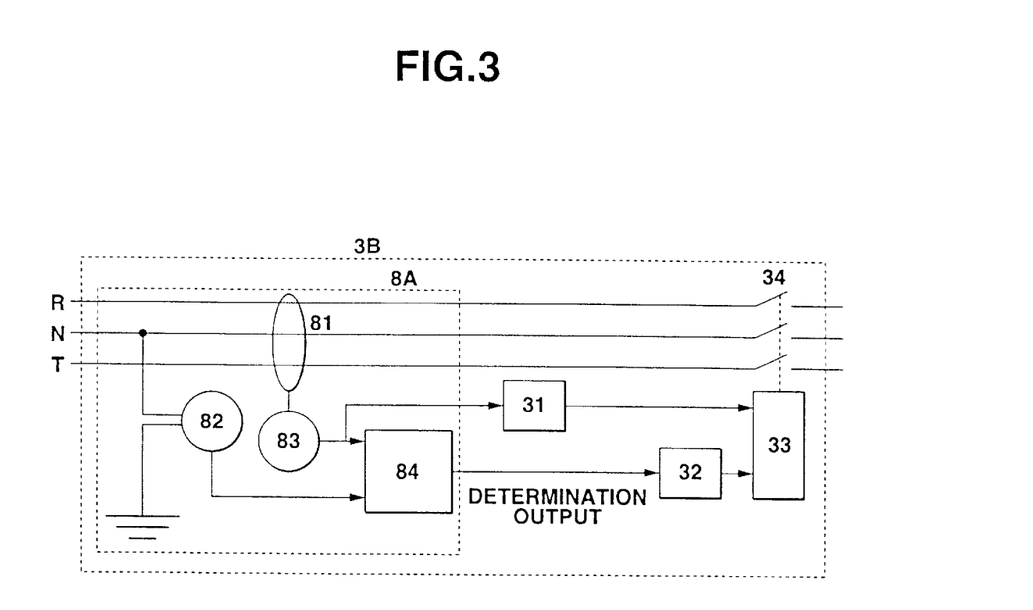
FIG. 3 is a schematic diagram illustrating an example of the configuration of an earth leakage breaker used in the present invention.

The earth leakage breaker 3B used in the second embodiment includes the ground-direction determination means 8A. The ground-direction determination means 8A may be incorporated within the earth leakage breaker 3B as shown in FIG. 2, or may be provided separately from the earth leakage breaker 3B. FIG. 3 is a schematic block diagram illustrating the configuration of the earth leakage breaker 3B.

The ground-direction determination means 8A includes voltage-to-ground detection means 82, a zero-phase current transformer 81, zero-phase-current detection means 83, and phase comparison means 84. The ground-direction determination means 8A determines that grounding has occurred outside the consumer A (external grounding) when the phase of the voltage to ground with reference to the zero-phase current is within a fixed phase range, determines that grounding has occurred inside the consumer A (internal grounding) when the phase of the voltage to ground is not within the fixed range, and outputs the result of the determination. In the second embodiment, it is determined that external grounding has occurred when the phase of the voltage to-ground is within a range between −30 degrees and −150 degrees (−90 degrees±60 degrees). In the case of the second embodiment, since the penetrating path has a stable floating capacitance, the range for determining external grounding can be narrower around −90 degrees (for example, 90 degrees±30 degrees). Various types of voltage detection means, current detection means and phase comparison means which can be used for the above-described purpose are commercially available as signal transducers, in which known techniques can be used.

The result of determination output from the phase comparison means 84 is transmitted to a time-limit selector 32 in order to select a time limit. More specifically, a time limit of 0.8 seconds is selected when it has been determined that external grounding has occurred, and 0.1 second is selected when it has been determined that internal grounding has occurred.

The result of the selection of the time limit is transmitted to contact driving means 33 together with the result of determination of zero-phase-current-level determination means 31 (having a determination level of 30 mA), in order to operate a contact 34.

(Operational Test)

When grounding having a current of 500 mA for 0.1 second was generated in the consumer B2 as in the first embodiment, it was confirmed that unnecessary disconnection of power supply in the power generation system did not occur. Furthermore, in the second embodiment, by setting the operational time limit when it is determined that external grounding has occurred to infinity, i.e., by setting non-operation, disconnection of power supply in the power generation system can be prevented even if grounding of a main wire of the distribution system 4 which is not protected against grounding has occurred. However, it is necessary to check whether or not non-operation is to be set, in consideration of necessity, such as safety of the system, or the like.

The receiving-end earth leakage breaker of the second embodiment can perform very precise determination of internal or external grounding, and need not reduce the response speed when internal grounding occurs. In other words, when internal grounding occurs, the receiving-end earth leakage breaker of the second embodiment operates entirely in the same manner as an ordinary receiving-end earth leakage breaker, and therefore has high safety.

Third Embodiment

Figure 4:
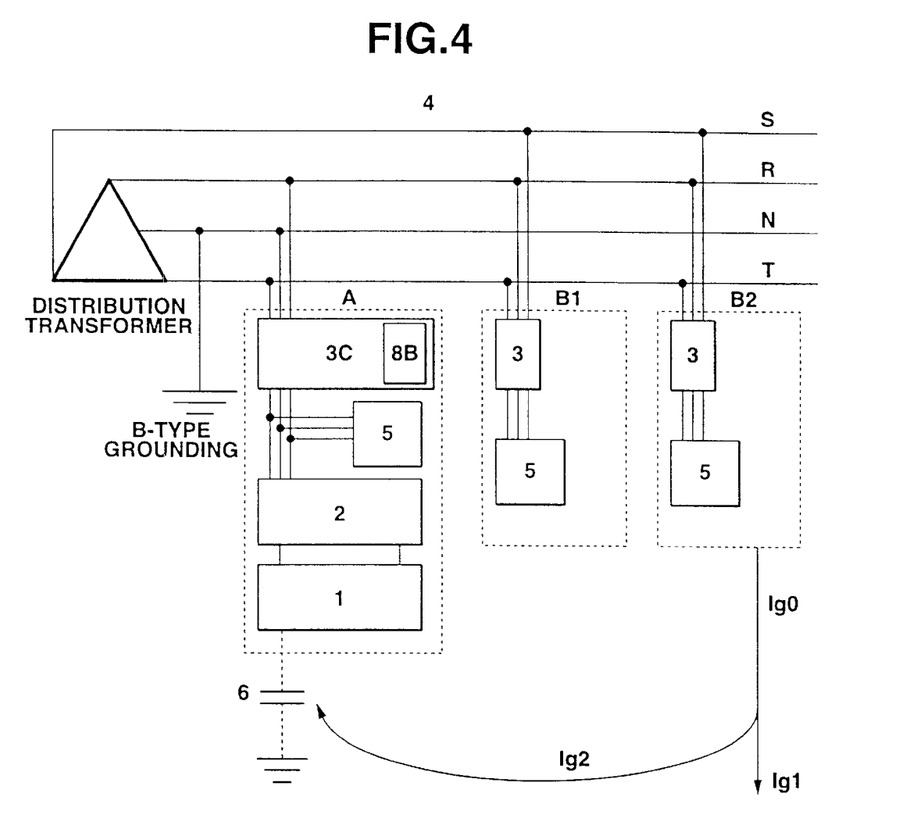
FIG. 4 is a schematic diagram illustrating a preferred example of connection between a power generation system and a low-voltage distribution system according to a third embodiment of the present invention.
Figure 6:
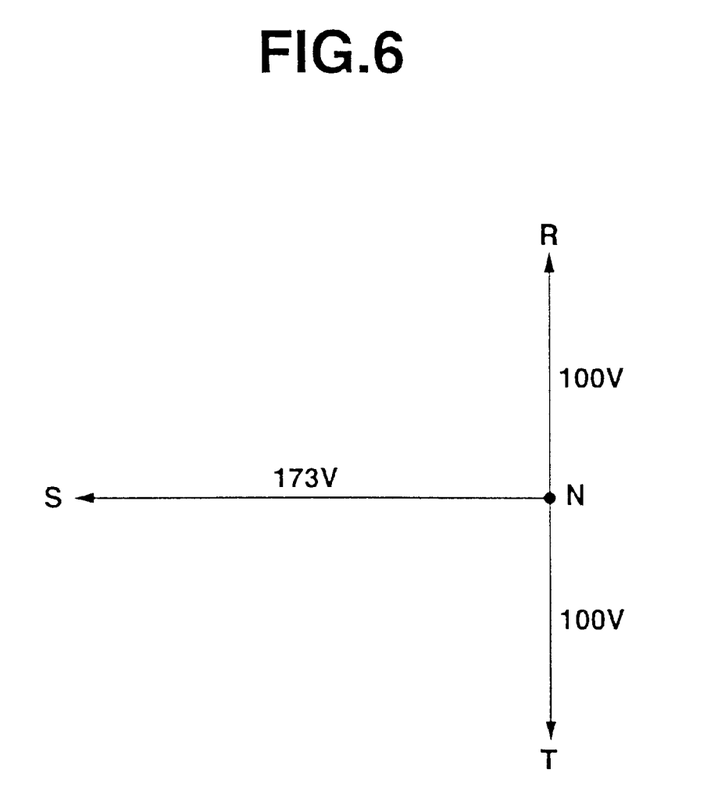
FIG. 6 is a voltage vector diagram of a common grounding system.

In a third embodiment of the present invention, a description will be provided of a case in which a low-voltage distribution system includes a single-phase system and a three-phase system which are commonly grounded (including modified V connection). Such a system tends to be very easily influenced by external grounding, particularly when a power generation system is connected to the single-phase system. The reasons will now be described with reference to drawings. FIG. 6 illustrates a vector diagram when a three-phase system subjected to Δ connection and a single-phase three-wire system are commonly grounded as shown in FIG. 4. When grounding occurs in the S phase (S wire), a larger potential to ground than when grounding occurs in the R phase or the T phase of the single-phase system is generated between a ground-side wire (neutral (N) conductor) of the single-phase system and the ground. As a result, the zero-phase current increases. That is, the ground current penetrating into the power generation system increases, and an unnecessary operation of the earth leakage breaker tends to occur. The present invention can provide larger effects when the power generation system is connected to a low-voltage distribution system having a commonly grounded conductor as in the above-described case. Such an example of common grounding is considered to be peculiar to a power generation system connected to a low-voltage distribution system.

In such a system, means which is simpler than that in the second embodiment can be used as ground-direction determination means. The third embodiment will now be more specifically described with reference to FIG. 4.

In FIG. 4, a solar-cell array 1, an inverter 2, a load 5, and receiving-end earth leakage breakers 3 of consumers B1 and B2 have the same configuration as in the first embodiment. Further description will be omitted for the same components as those described in the second embodiment.

(Low-Voltage Distribution System 4)

Figure 7:
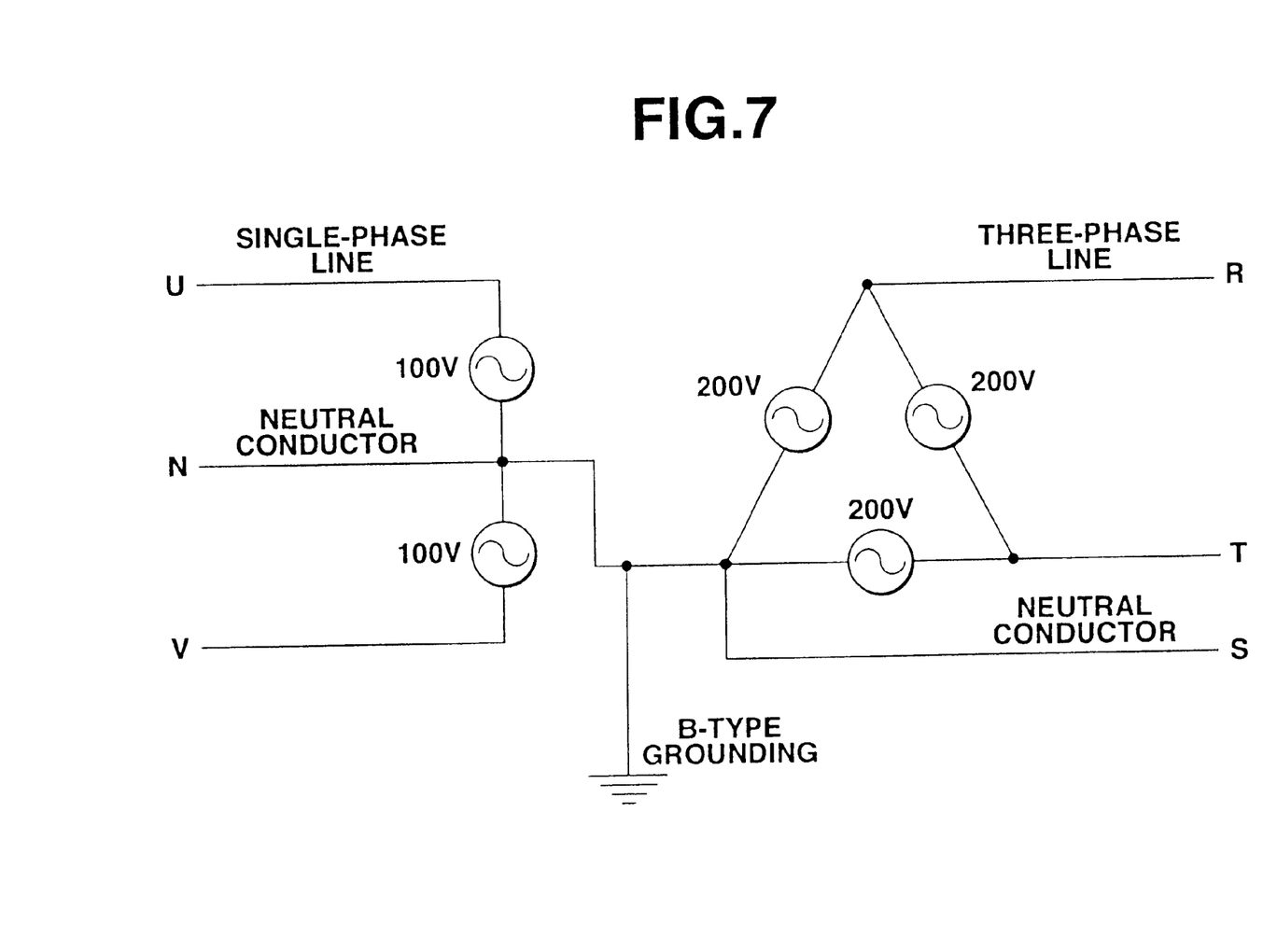
FIG. 7 is a schematic diagram illustrating a common grounding system which can be connected to the power generation system of the third embodiment.

A system in which a single-phase three-wire system and a three-phase system are commonly distributed from a three-phase transformer as shown in FIG. 4 is used as a low-voltage distribution system. Two systems having a common grounded point, for example, systems in which each system individually has a transformer as shown in FIG. 7, or modified V connection in which two single-phase transformers are combined, may also be applied to the third embodiment instead of the above-described configuration.

(Breaker 3C)

Figure 5:
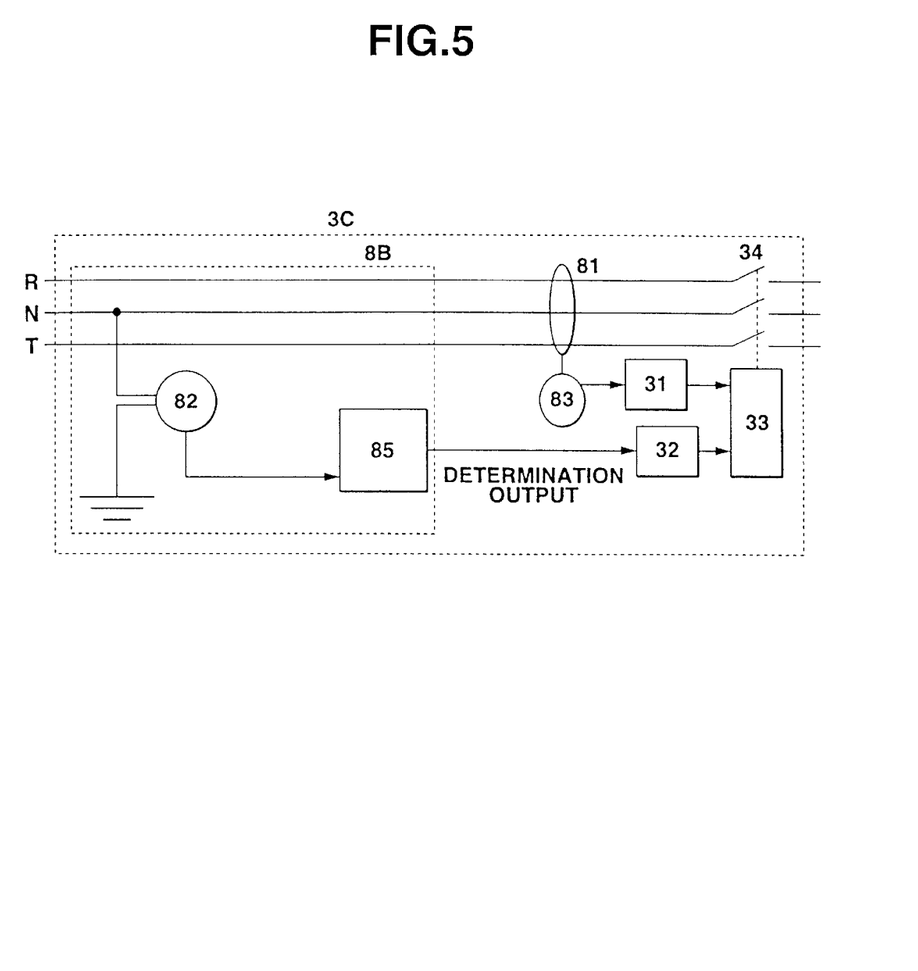
FIG. 5 is a schematic diagram illustrating another example of the configuration of an earth leakage breaker used in the present invention.

Direction determination means 8B which is simpler than in the second embodiment may be utilized as a breaker 3C used in the third embodiment. FIG. 5 schematically illustrates such breaker 3C and direction determination means 8B. More specifically, in the case of FIG. 5, an output level of voltage-to-ground detection means 82 is determined voltage-to-ground-level determination means 85. That is, in the third embodiment, whether external grounding or internal grounding occurs is determined by determining only a voltage to ground of a neutral (N) conductor. More specifically, the determination means 85 determines that internal grounding has occurred when the output of the voltage-to-ground detection means 82 is lower than a preset voltage threshold, and determines that external grounding has occurred when the output of the voltage-to-ground detection means 82 is higher than the preset voltage threshold. The determination output is transmitted to a time-limit selector 32 in order to select a time limit. The result of selection of the time limit is transmitted to contact driving means 33 together with a result of determination of zero-phase-current-level determination means 31, in order to operate a contact 34. It is convenient to set the voltage threshold so that it is determined that external grounding has occurred when a voltage higher than the voltage of a system where the power generation system is connected is detected. By actually generating worst-case grounding (grounding for causing the highest voltage to ground) within the power generation system and setting the voltage threshold with reference to the potential to ground at that time, the voltage threshold can be made lower. Hence, this is preferable from the viewpoint of protection of the power generation system. In the third embodiment, by also taking into consideration of fluctuations in the voltage of a commercial system, the voltage threshold is set to 110 V.

In the second embodiment, direction is determined by comparing phases. In the third embodiment, however, direction is determined by detecting the voltage. Accordingly, the third embodiment has features in that the configuration is simplified and the cost is lower.

Since operations other than the determination of direction are the same as in the second embodiment, further description thereof will be omitted.

(Operational Test)

Grounding (500 mA with 0.1 second) of the S phase was generated in the consumer B2. It was confirmed that the potential to ground was raised to about 130 V, and no unnecessary disconnection of electric power supply (an unnecessary operation of the earth leakage breaker) did not occur. However, unnecessary disconnection of electric power supply occurred when grounding of the R phase or the T phase which is common to the single-phase distribution system was generated. This is because the potential to ground is not raised to 110 V in such a case. Such unnecessary disconnection of electric power supply can be prevented by increasing the operational time limit of the earth leakage breaker 3C by providing the same time-limit selector 32 as in the second embodiment.

The optimum system for determining direction using the voltage to ground as in the third embodiment corresponds to a case in which, as shown in FIG. 7, each of a single-phase system and a three-phase system individually has a transformer and one wire of each of the systems is commonly grounded. In contrast to the case shown in FIG. 4, in the case shown in FIG. 7, the potential to ground is raised even when grounding occurs in the R phase or the T phase, so that it is possible to determine whether internal grounding or external grounding has occurred. That is, in the case shown in FIG. 7, the time-limit selector 32 is unnecessary. In the case shown in FIG. 7, since the neutral conductor S phase and N phase are originally grounded, it is generally unnecessary to detect grounding in these phases.

As described above, the present invention has the following pronounced effects.

(1) An unnecessary operation of disconnecting electric power supply is not performed when an accident of external grounding occurs. As a result, the frequency of occurrence of failures of electric power supply in a power generation system is reduced.

(2) Since the frequency of occurrence of failures of electric power supply is reduced, the occurrence of interruption of power generation is reduced, and therefore a loss in power generation hardly occurs.

The individual components designated by blocks in the drawings are all well known in the power generation system arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A power generation system comprising:
a DC power supply connected to a low-voltage distribution system one wire of which is grounded, via a receiving-end earth leakage breaker, and comprising at least a transformerless inverter and an earth floating capacitance; and
ground-direction determination means for determining whether a grounded position is inside or outside said power generation system.

2. A power generation system according to claim 1, wherein a time until the receiving-end earth leakage breaker operates when said ground-direction determination means has determined that the grounded position is inside said power generation system is shorter than a time until said receiving-end earth leakage breaker operates when said ground-direction determination means has determined that the grounded position is outside said power generation system.

3. A power generation system according to claim 1, wherein the receiving-end earth leakage breaker operates when said ground-direction determination means has determined that the grounded position is within said power generation system, and the receiving-end earth leakage breaker does not operate when said ground-direction determination means has determined that the grounded position is outside said power generation system.

4. A power generation system according to claim 1, wherein the low-voltage distribution system comprises a single-phase low-voltage distribution system and a three-phase distribution system which are commonly grounded.

5. A power generation system according to claim 1, wherein said ground-direction determination means determines whether the grounded position is inside or outside said power generation system from a phase difference between a voltage to ground of a grounded-side terminal of the low-voltage distribution system and a zero-phase current.

6. A power generation system according to claim 4, wherein said transformerless inverter is connected to the single-phase distribution system, and wherein said ground-direction determination means determines that the grounded position is outside said power generation system when a voltage to ground of a grounded-side terminal of the single-phase distribution system is higher than a normal value in the single-phase distribution system.

7. A power generation system according to any one of claims 1 through 6, wherein said DC power supply comprises a solar cell.

8. A power generation system according to claim 7, wherein said solar cell comprises solar-cell modules, each comprising a solar-cell element and a metal plate.

9. A power generation system according to claim 8, wherein said metal plate is grounded.

10. A power generation system according to claim 7, wherein said DC power supply comprises a solar-cell array in which a plurality of solar cells are connected in series and/or in parallel.

11. A power generation system comprising:
a DC power supply connected to a low-voltage distribution system one wire of which is grounded, via a receiving-end earth leakage breaker, and comprising at least a transformerless inverter and an earth floating capacitance, said receiving-end earth leakage breaker comprising:
voltage-to-ground detection means;
a zero-phase current transformer;
zero-phase-current detection means connected to said zero-phase current transformer;
phase comparison means connected to said voltage-to-ground detection means and said zero-phase-current detection means;
a time-limit selector, connected to said phase comparison means, for selecting a different time limit in accordance with a signal output from said phase comparison means;
zero-phase-current-level determination means connected to said zero-phase-current detection means; and
contact driving means, connected to said zero-phase-current-level determination means and said time-limit selector, for driving a contact in accordance with an output of each of said zero-phase-current-level determination means and said time-limit selector.

12. A power generation system comprising:
a DC power supply connected to a low-voltage distribution system one wire of which is grounded, via a receiving-end earth leakage breaker, and comprising at least a transformerless inverter and an earth floating capacitance, said receiving-end earth leakage breaker comprising:
voltage-to-ground detection means;
voltage-to-ground-level determination means connected to said voltage-to-ground detection means;
a zero-phase current transformer;
zero-phase-current detection means connected to said zero-phase current transformer;
zero-phase-current-level determination means connected to said zero-phase-current detection means; and
contact driving means, connected to said zero-phase-current-level determination means and said voltage-to-ground-level determination means, for driving a contact in accordance with an output of each of said zero-phase-current-level determination means and said voltage-to-ground-level determination means.

13. A power generation system comprising:

a DC power supply connected to a low-voltage distribution system one wire of which is grounded, via a receiving-end earth leakage breaker, and comprising at least a transformerless inverter and an earth floating capacitance, said receiving-end earth leakage breaker comprising:

voltage-to-ground detection means;

voltage-to-ground-level determination means connected to said voltage-to-ground detection means;

a time-limit selector, connected to said voltage-to-ground-level determination means, for selecting a time limit in accordance with an output of said voltage-to-ground detection means;

a zero-phase current transformer;

zero-phase-current detection means connected to said zero-phase current transformer;

zero-phase-current-level determination means connected to said zero-phase-current detection means; and contact driving means, connected to said zero-phase-current-level determination means and said time-limit selector, for driving a contact in accordance with an output of each of said zero-phase-current-level determination means and said time-limit selector.

14. A power-generation-system installing method comprising the step of:

connecting a power generation system including a DC power supply, including at least a transformerless inverter and an earth floating capacitance, to a low-voltage distribution system one wire of which is grounded, via a receiving-end earth leakage breaker, wherein ground-direction determination means for determining whether a grounded position is inside or outside the power generation system is provided.

15. A method according to claim 14, wherein control means for performing control such that a time until the receiving-end earth leakage breaker operates when the ground-direction determination means has determined that the grounded position is inside the power generation system is shorter than a time until the receiving-end earth leakage breaker operates when the ground-direction determination means has determined that the grounded position is outside the power generation system is provided.

16. A method according to claim 14, wherein control means for performing control such that the receiving-end earth leakage breaker operates when the ground-direction determination means has determined that the grounded position is within the power generation system, and the receiving-end earth leakage breaker does not operate when the ground-direction determination means has determined that the grounded position is outside the power generation system is provided.

17. A method according to claim 14, wherein ground-direction determination means for determining whether the grounded position is inside or outside the power generation system, from a phase difference between a voltage to ground of a grounded-side terminal of the low-voltage distribution system and a zero-phase current is used as the ground-direction determination means.

18. A method according to any one of claims 13 and 14 through 17, wherein a power supply including a solar cell is provided as the DC power supply.

19. A method according to claim 18, wherein solar-cell modules, each including a solar-cell element and a metal plate, are used for the solar cell.

20. A method according to claim 19, further comprising the step of grounding the metal plate.

21. A method according to claim 18, wherein a solar-cell array in which a plurality of solar cells are connected in series and/or in parallel is provided as the DC power supply.

* * * * *